Dec. 28, 1965  J. F. HELLER ETAL  3,225,999
JOINING DEVICE FOR METAL STRIP MATERIAL
Filed Oct. 1, 1962  4 Sheets-Sheet 1
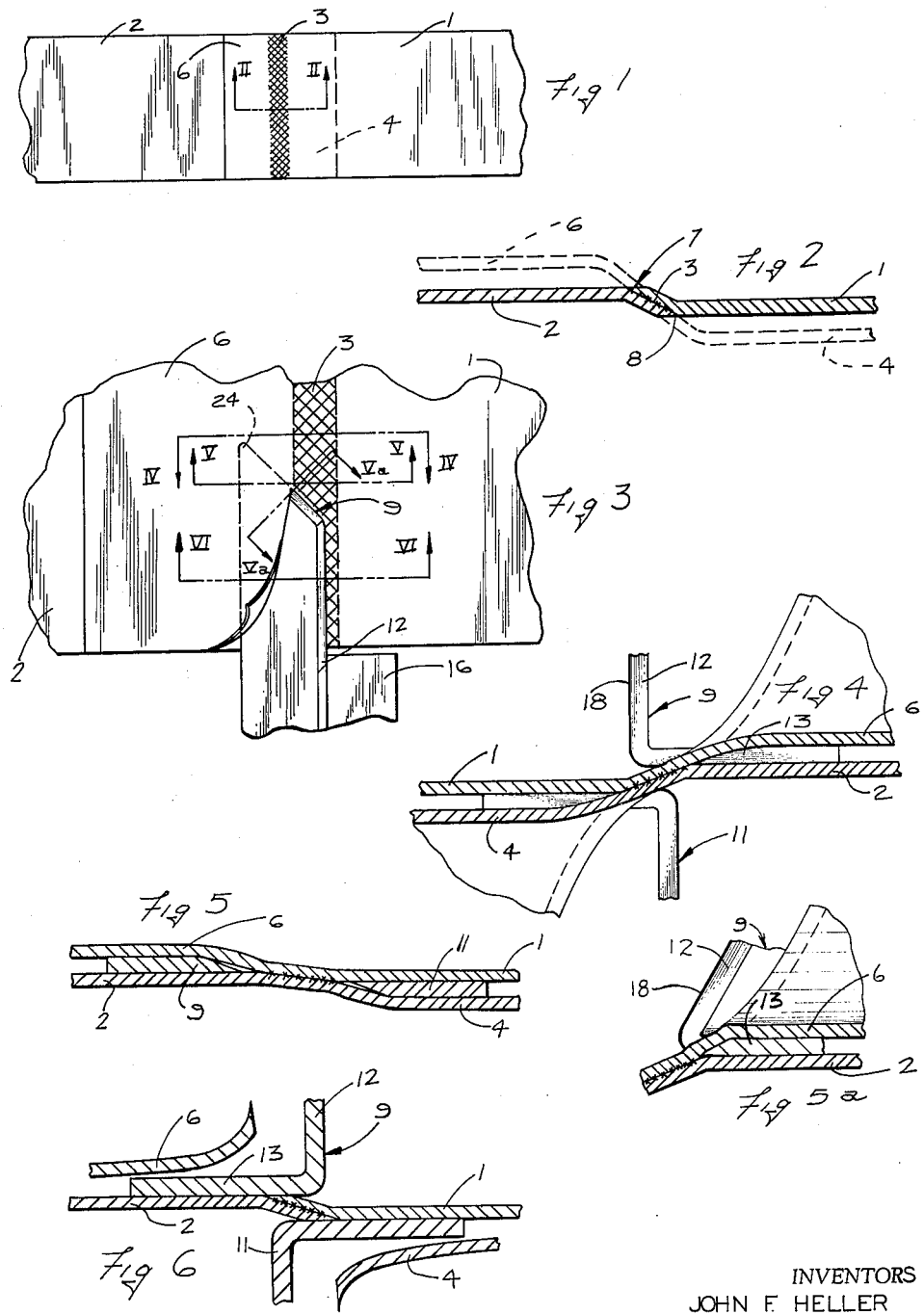
INVENTORS
JOHN F. HELLER
JOHN D. MORLEY
BY
Woodhams, Blanchard and Flynn
ATTORNEYS Dec. 28, 1965     J. F. HELLER ETAL     3,225,999
JOINING DEVICE FOR METAL STRIP MATERIAL
Filed Oct. 1, 1962     4 Sheets-Sheet 2
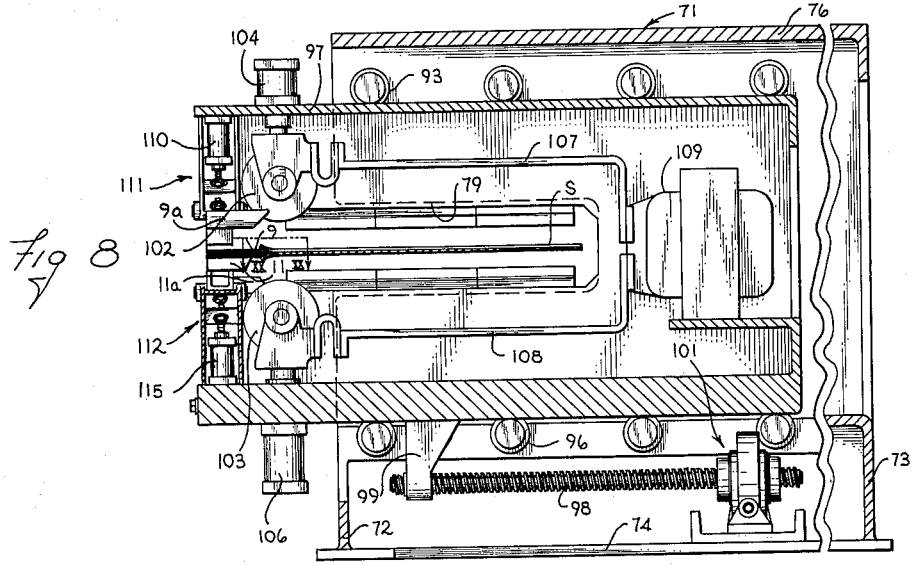
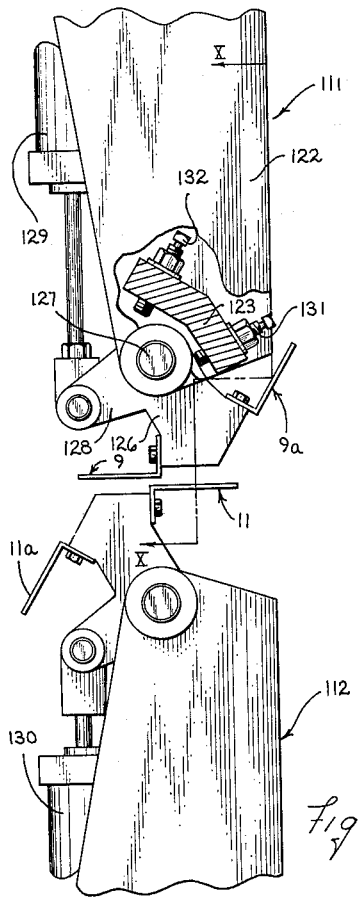
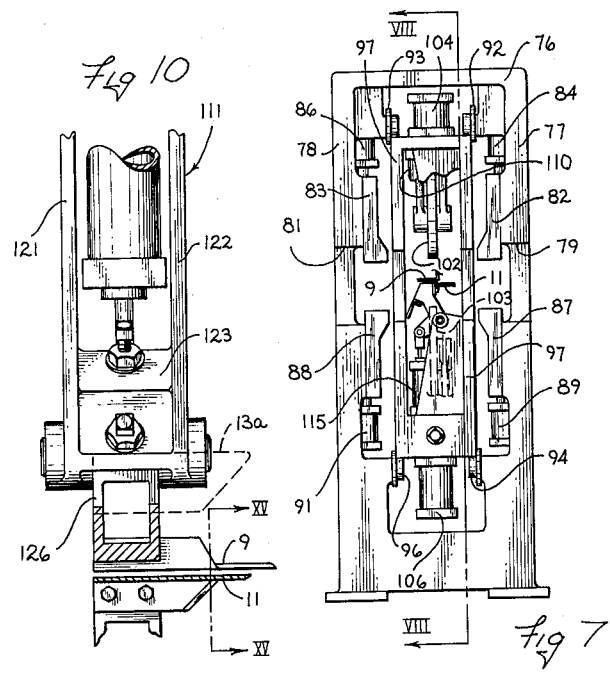
INVENTORS
JOHN F. HELLER
JOHN D. MORLEY
BY
Woodhams, Blanchard and Flynn
ATTORNEYS

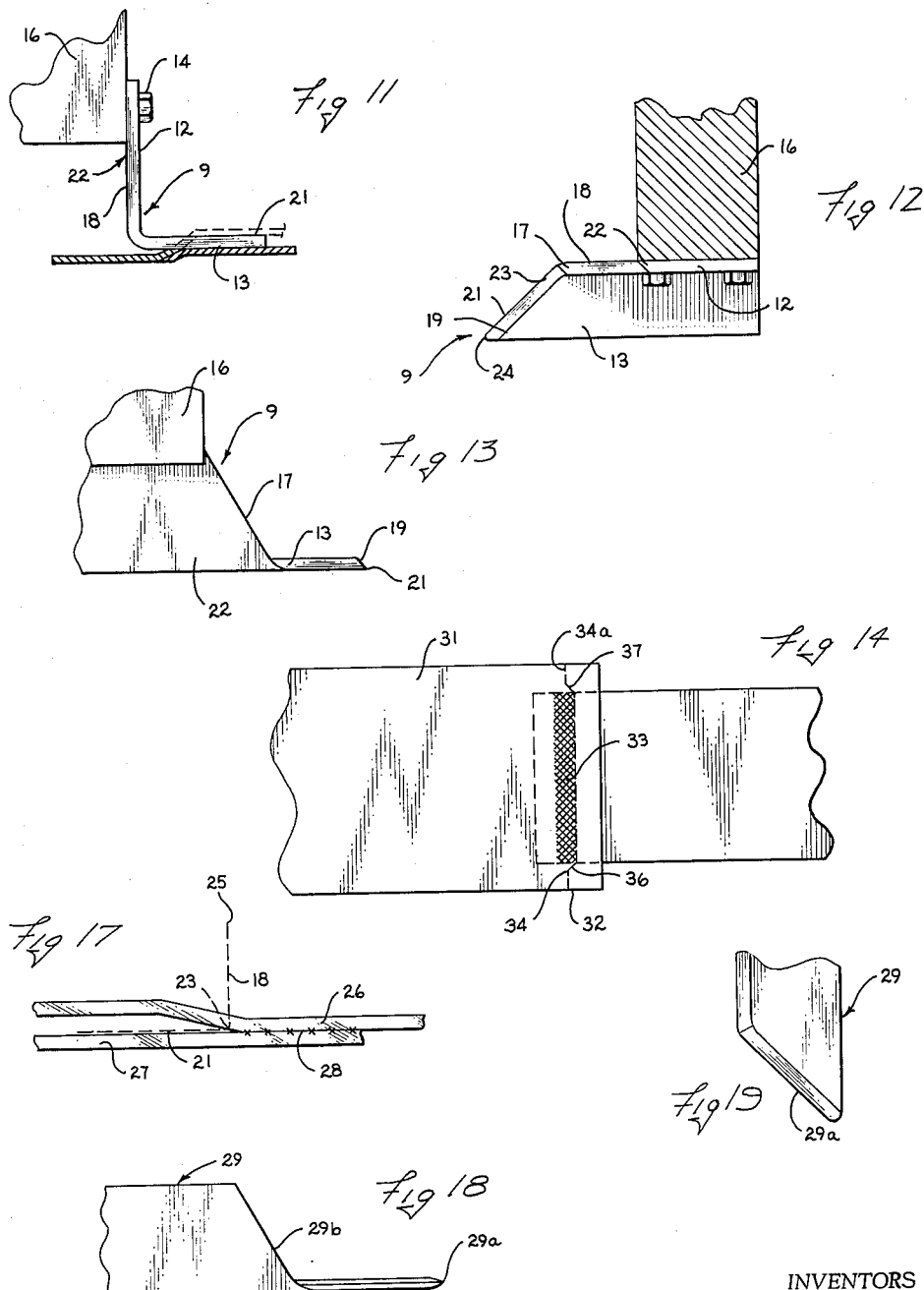

INVENTORS
JOHN F. HELLER
JOHN D. MORLEY
BY
ATTORNEYS

3,225,999
JOINING DEVICE FOR METAL STRIP MATERIAL
John F. Heller, Lyndhurst, Ohio, and John D. Morley, Monitor Township, Bay County, Mich., assignors to National Electric Welding Machines Co., Bay City, Mich., a corporation of Michigan
Filed Oct. 1, 1962, Ser. No. 227,446
3 Claims. (Cl. 228—4)

This invention relates to means for joining the ends of metallic strip material and it relates particularly to a method and means providing for the overlapping of the strip ends to be joined, joining together of the overlapped portions by any convenient means, such as welding, and separating along a line adjacent the joint any overlapped but non-joined material.

In both the manufacture and use of elongated strip material, such as steel, there are many instances where such material is handled on a continuous basis even though it may be supplied from individual successively presented rolls. For example, in the manufacture of steel strip such operations as annealing, edge trimming, pickling, surface treating and others are carried out at very high rates of speed which speed must, in many cases, be maintained at a uniform value. This material is normally supplied to the processing equipment in the form of successively presented rolls thereof and the trailing end of one strip is fastened to the leading end of the next strip by suitable means in order that a continuous strip may be supplied to the processing means.

In order to keep the strip material going through the processing equipment at a continuous and uniform rate of speed, and yet provide for momentary stopping of the end thereof in order to effect the above-mentioned joining of the strip ends together, it is customary and effective to provide one or more loops in said strip between the trailing end thereof and the processing means from which to feed the processing means during the time a trailing strip end is stopped for fastening of same to the leading end of the next strip. However, since the rate of speed of the strip through many processing systems is very high, in some instances as high as 4000 feet per minute, it will be apparent that the fastening together of the ends must be accomplished in an extremely short period of time if such loops are to be kept within a manageable size. Further, it will be apparent that any method or apparatus by which the time required to effect the joining of such strip ends together is substantially reduced will be of great commercial value.

Many approaches have been made to solving this problem, one of the most common being to seam weld together suitable overlapped adjacent strip ends, whereas other approaches include taping the ends together, mechanically interlocking overlapped ends and the use of adhesives. Each of these previously known techniques, though acceptable for certain uses, has presented difficulties which have been recognized as being undesirable but which have been tolerated as unavoidable. For example, the taping technique is strong enough for some uses and is rapid but creates objectionable additional thickness at the joints. The mechanical interlock does not always provide ample strength. Welding techniques, as presently practiced, provide the necessary strength by mashing of the welded zone which enables same to be made without producing a double thickness at the joint. However, this requires pre-trimming of the ends in order to control the amount of overlap and hence is undesirably time-consuming.

The same problems exist in supplying strip material to means for utilizing same, such as continuously operating punch presses, although the time requirement is not usually so acute inasmuch as the strip speeds involved are usually considerably less than the speeds involved in such processes as those above mentioned.

Accordingly, the objects of the invention include:

(1) To provide a method for joining adjacent ends of strip segments and doing so at a high rate of speed and in a manner to provide good strength therebetween.

(2) To provide a method, as aforesaid, wherein it is unnecessary to trim the overlapped ends of the strips before joining, wherein excess material may be readily trimmed off after joining on either side of the joint to provide a smooth well trimmed and tight joint free of excess or unjoined material.

(3) To provide a method, as aforesaid, to remove the excess or unjoined material substantially during the joining or welding operation thereby securing a welded and trimmed joint without adding appreciable time for this function.

(4) To provide a method, as aforesaid, which is applicable to a wide range of materials, primarily weldable metals and which can be carried out by a wide range of apparatus.

(5) To provide a method, as aforesaid, which can be practiced by relatively simple and therefore inexpensive equipment.

(6) To provide apparatus capable of carrying out the method, as aforesaid.

(7) To provide apparatus, as aforesaid, which will be readily applicable with only slight and easily made modifications to strip material of different kinds, thicknesses and widths.

(8) To provide apparatus, as aforesaid, utilizing welding techniques for effecting the fastening of the strip material together.

(9) To provide apparatus, as aforesaid, which under circumstances of use wherein a continuous welded seam is employed as a joint, or wherein a row of spot welds are used as a joint, the apparatus will use the weld zone itself as a guide for removal of excess metal extending beyond said seam.

(10) To provide apparatus, as aforesaid, which will be inexpensive both to manufacture and to maintain in good operating condition.

Other objects and purposes of the invention will be apparent to persons acquainted with the method and apparatus of this general type upon reading the following disclosure and inspection of the accompanying drawings.

In the drawings:

FIGURE 1 is a top view of the sheets of overlapped material after welding but prior to trimming of same.

FIGURE 2 is a section taken on the line II—II of FIGURE 1 and showing in broken lines the portions of the overlapped sheets which are trimmed off and showing in solid lines the finished product.

FIGURE 3 is a top view of the overlapped sheets showing a cutting blade in operating position.

FIGURE 4 is a section taken on the line IV—IV of FIGURE 3.

FIGURE 5 is a section taken on the line V—V of FIGURE 3.

FIGURE 5a is a section taken on the line Va—Va of FIGURE 3.

FIGURE 6 is a section taken on the line VI—VI of FIGURE 3.

FIGURE 7 is an end schematic view taken transversely to the sheets being joined of a machine embodying the apparatus aspects of the invention and capable of performing the method of the invention.

FIGURE 8 is a side schematic view of the machine shown in FIGURE 7.

FIGURE 9 is a detail of the cutters and mounting means for same taken generally as indicated on the line IX—IX of FIGURE 7.

FIGURE 10 is a section taken on the line X—X of FIGURE 9.

FIGURE 11 is a detail showing the leading end of an effective cutting tool.

FIGURE 12 is a top view of the tool shown in FIGURE 11.

FIGURE 13 is a side elevation of the tool shown in FIGURES 11 and 12.

FIGURE 14 illustrates the operation of the tool shown in FIGURES 11 to 13 where the overlapped strips are of different widths.

Figures 15, 16, 20:
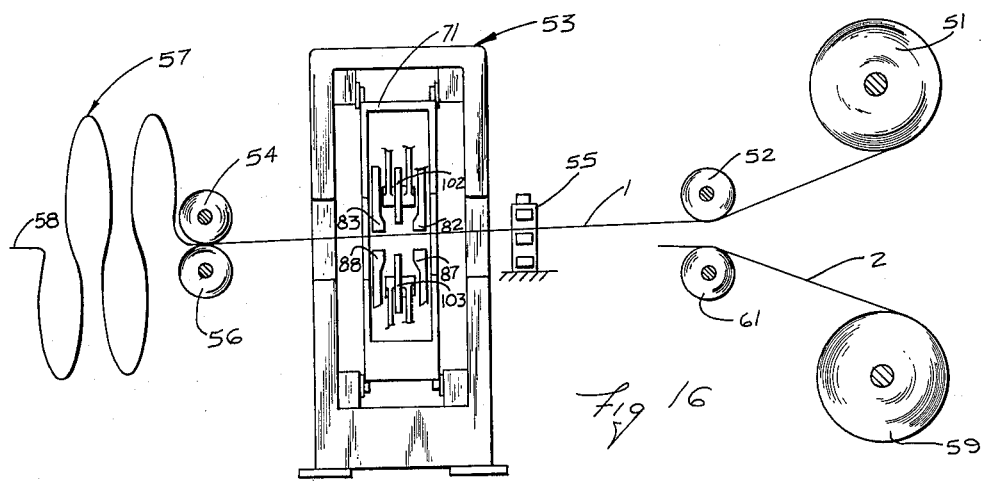

FIGURE 15 in parts (*a*) and (*b*) thereof diagrammatically illustrates the apparatus of FIGURE 9 in alternate positions of operation and taken with respect to the cutting tools from line XV—XV of FIGURE 10.

FIGURE 16 indicates one environment in which the method and apparatus of the invention are used.

FIGURE 17 indicates a modified manner of applying the cutting tool to the work.

FIGURE 18 illustrates a modified form of cutting tool.

FIGURE 19 is a top view of a fragment of the cutting tool shown in FIGURE 18.

FIGURE 20 is a top view taken along the line XX—XX of FIGURE 8.

General description

In general the method aspects of the invention comprise first overlapping the respective trailing and leading ends of the strips to be joined, next joining same along a line substantially transverse to the longitudinal center lines of said strips, and lastly trimming the excess material extending beyond the joined-together zone of one strip by a cutting tool placed between the material to be trimmed off and the main body of the other strip. Simultaneously, if desired, the excess material extending beyond the weld zone on the other strip may be similarly trimmed. A further and highly important aspect of the invention, applicable where the joining of the strips is by a continuously applied seam weld or by a series of spot welds, comprises guiding the trimming tool along the edge of and against the weld nugget.

The apparatus aspects of the invention comprise clamping means for clamping together the adjacent ends of the strip material, welding means such as a pair of resistance seam or spot welding electrodes for providing a suitable joining of said overlapped and clamped strips and a pair of cutting tools arranged for being positioned respectively between the overlapped material adjacent each side of the zone of said joining and for cutting the loose ends therefrom.

Detailed description

In describing the method of the invention it will be more readily understood if the same proceeds in terms of illustrative apparatus by which said method is practiced. It should be understood, however, that in setting forth said method in terms of certain specific apparatus, our intent is solely to render such description convenient to follow and no intent should be implied that such particular apparatus is essential to the practice of said method. Instead, it will be readily recognized by those skilled in the art that specific devices of many types may be employed for carrying out the steps of the method and the ones hereinafter specifically set forth are only for illustrative purposes.

Similarly, it will be recognized that all of the hereinafter following description is set forth in terms of the fastening together of strips of ferrous material by resistance seam welding which specific reference is solely for illustrative purposes and should by itself import no limitation other than those defined by the hereinafter appended claims.

Referring now to the drawings, there is shown overlapped strips 1 and 2 which are joined together through a zone of joining 3. For the purposes of illustration it may be assumed that said strips 1 and 2 are of steel and the joining is effected by conventional resistance seam welding. The free ends 4 and 6 extend any convenient distance beyond the weld zone 3 to insure an effective weld. These may be of any length providing that a good weld is obtained and the fact that this dimension is not critical is one of the advantages of the invention.

After the strips 1 and 2 are overlapped and welded or otherwise joined together, any kind of a cutting tool, such as a suitable knife 9, is inserted between the free end 6 and the main body 2 for cutting off said free end 6 along a surface indicated at 7 closely adjacent the weld zone 3. A similar tool 11 will be inserted, preferably simultaneously but subsequently if preferred, between the free end 4 and the main body 1 for cutting off said free end 4 along a surface 8 adjacent the other side of the weld zone 3.

While the particular design of the knives 9 and 11 may vary widely, the design is nevertheless important and one effective and preferred design will now be described.

Referring to the knife 9 (FIGURES 11–13) there is provided a vertical portion 12 and a horizontal portion 13 (the terms vertical and horizontal being here taken for identification only and while indicating the usual position of operation of these knives, by no means indicate any necessary limitation). The vertical portion 12 is fastened by any suitable means, such as screws of which one is indicated at 14, to a mounting beam 16 which may assume any convenient form dependent upon the details of the machine by which the operation is carried out. Said vertical portion 12 of the knife has a tapered edge 17 at its leading end, the same being provided with a sharpened edge 18. The horizontal portion 13 of the knife has a tapered leading end 19 which is provided with the sharpened edge 21. Preferably, though not in all cases necessarily, the sharpened edge 18 of the vertical portion will be in alignment with the surface 22 thereof, namely, that surface which is the outside of the knife structure, while the sharpened edge 21 will preferably occupy a position in the plane of the bottom surface of the portion 13. The sharpened edges 21 and 18 blend into each other at a curved portion 23.

The lower knife 11 (FIGURES 4–6) will be the same as the knife 9 just described and hence no further description thereof will be needed.

Normally, when the knife 9 is introduced by its tip 24 between the free end 6 and the sheet 2, the leading edge 21 thereof will engage the free end 6 closely adjacent the weld zone 3 and as said knife 9 is caused to move transversely of said sheets, the free end 6 will be cut or peeled from its connection with the metal in said weld zone 3. In such instance, the cutting edge 18 on the vertical portion 12 is not utilized and insofar as this operation is concerned may be omitted. However, it has utility for other situations which will be described hereinafter.

Where very heavy sheets of metal are being cut so that it is difficult to bend the free end 6 upwardly away from the main body 2 as indicated in FIGURE 4, or where it is essential to have a cut extremely close to the weld zone so that there is little or no metal extending beyond the zone of joining, then the knife may be aligned so that its curved edge 23 is located adjacent the weld zone as indicated in FIGURE 17, where the numerals 26 and 27 indicate relatively heavy sheets of metal joined at a weld zone 28 and the broken line 25 indicates the relationship of the cutting edge to said sheets. The horizontal part of the broken line 25 indicates the edge 21 of the knife and the vertical portion of said broken line 25 indicates the cutting edge 18 of the knife 9.

FIGURES 18 and 19 show a modified knife 29, desirable for some applications, especially to lighter gauge metal, wherein the cutting edge 29a is intermediate the upper and lower surfaces of the horizontal portion of the knife.

While the knife may be guided by the mechanism driving same along the edge of the weld zone 3 in any convenient manner, it has been found that the weld zone itself is an effective guide and may be relied upon to a substantial extent for insuring suitable guiding of the knife. The reason for this is not fully understood but it is believed that the change in crystalline structure of the metal within the weld zone sufficiently hardens same that the knife will follow said zone effectively. Regardless, however, of the correctness of this explanation, the effect has been observed on sufficient occasions with sufficient different types of metal that the result as described can be relied upon.

Evidence of the action of the weld zone and guiding the knife may be found where the method is utilized to connect strip material of different widths as illustrated in FIGURE 17. Here the knife will be caused to enter by its vertical cutting edge 18 (FIGURES 11–12) at the point 32 which is aligned roughly intermediate the side edges of the welded zone 33. Said knife first follows the line 34 substantially transverse to the strip 31 until it reaches the end of the welded zone 33. At this point it makes a jog 36 sidewardly to the edge of the welded zone and then continues transversely cutting the end of the strip 31 along a line adjacent to and guided by the welded zone 33. At the other end of the welded zone 33, said knife makes another jog at 37 in response to the means generally aligning the vertical edge of said knife with the line 34 to resume cutting said strip 31 along the line 34a which is in alignment with said line 34 to the other edge of the strip 31.

Turning now to a more detailed consideration of one particular preferred mechanism by which the above-described process may be carried out, reference is made to FIGURES 7–10. Said figures are largely schematic in character but will be sufficient to disclose to those skilled in the art the essentials of a construction embodying the substance of the invention.

Referring first to FIGURE 16 there is shown a first roll of material 51 from which strip material, which may be taken as strip steel for the purpose of the following description, is fed under a guide roll 52 thence through the joining device 53, thence through a pair of drive rolls 54 and 56, thence through a conventional loop to the segment 58 thereof which feeds directly to the desired utilizing or processing equipment. A second roll of material 59 is placed below roll 51 and feeds past a guide roll 61 toward the joining device 53. As roll 51, for example, becomes exhausted, it is the function of the joining device 53 to join the trailing end of the roll 51 with the leading end of the fresh roll placed at 59 and to do so without stopping of the feed at 58. Likewise, when the roll 59 becomes exhausted its trailing end will be joined with the leading end of a fresh roll placed at 51.

In the device here schematically illustrated, a frame 71 (FIGURES 7 and 8) is mounted upon supports 72 and 73 onto a suitable base 74, said frame 71 having a top portion 76 and side portions 77 and 78. Openings 79 and 81 are provided in the side portions 77 and 78, respectively, of generally C-shape through which passes the strips 1 and 2 to be joined.

Mounted on the frame 71 in any convenient manner are slidably mounted upper clamps 82 and 83 actuated by suitable pressure fluid responsive means, such as air cylinders 84 and 86. Lower clamping means 87 and 88 are slidably mounted on the lower part of the frame member and are moved upwardly and downwardly by suitable pressure responsive means 89 and 91 in a manner generally similar to the upper clamping means 82 and 83. Thus, actuation of said pressure fluid responsive means 84, 86, 89 and 91 by any means responsive to the appearance of the trailing end of a sheet of strip material will actuate the feed of the new roll and the two ends may be overlapped either automatically or by hand and firmly clamped between the clamp members 82 and 83 on the upper side and members 87 and 88 on the lower side. All of this is conventional and needs no further explanation.

Said frame 71 also has a plurality of upper rollers 92 and 93 arranged along the upper side thereof and a plurality of lower rollers 94 and 96 arranged along the lower side thereof. The welding carriage 97 is held within said rollers and is arranged for reciprocation transversely across the strip material to be joined. Such reciprocation can be effected in any convenient manner, such as by a screw 98 acting against an abutment 99 and driven by any convenient reversible means 101 which may be powered from a suitable source not shown. Seam weld electrodes 102 and 103 are mounted, respectively, on the upper and lower parts of the welding carriage 97 and moved toward and away from the work in any convenient manner, such as by pressure fluid cylinders 104 and 106, respectively, which are actuated in any conventional manner not shown. The welding electrodes 102 and 103 are connected in in any convenient manner by conductors 107 and 108 to a suitable energized welding transformer 109 which is mounted as convenient on the carriage 97. Thus, after the overlapped ends of the strip material to be joined are clamped as above-mentioned, the carriage 97 will travel in response to rotation of the screw 98 rightwardly as appearing in FIGURE 8 and the seam welding electrodes 102 and 103 will weld said overlapped strips together.

Mounted also upon the traveling carriage 97 are cutting tool assemblies 111 and 112 which assemblies move vertically toward and away from the workpieces in response to suitable means, normally actuated simultaneously with the corresponding movement of the welding electrodes. Said tool mounting means are positioned with respect to said electrodes so that as said electrodes move across the work they follow immediately behind said electrodes for slitting the excess material in a manner above-described.

Said cutting tool structure is mounted in any convenient manner but the structure illustrated in FIGURES 9 and 10 indicate one convenient and effective means of so doing. Looking first at the mounting unit 111, it comprises a frame structure including a pair of hangers 121 and 122 suitably connected by cross members of which one appears at 123. A cutting tool bracket 126 (corresponding in function to bracket 16 in FIGURES 11–13) is pivotally mounted at 127 to the lower ends of the hangers 121 and 122 and includes an arm 128 which is operable upwardly and downwardly by any convenient means such as a fluid pressure cylinder 129. The adjustable screws 131 and 132 are mounted on the cross piece 123 to limit the rotative movement of the bracket 126 around the pivot 127 to precisely adjustable positions. The cutting tool 9 is affixed to the lower end of the bracket 126 and is arranged as shown in FIGURE 9 in substantially the same manner as the cutting tools illustrated and described in connection with FIGURES 11 through 13. Mounted on the same bracket 126 is a further cutting tool 9a which constitutes a mirror imgae of the cutting tool 9 and it is positioned relative to the cutting tool 9 as shown in FIGURE 9. One cutting tool or the other will be moved by the cylinder 129 into operative position depending upon whether the overlap of the overlapped strip material is located so that the free end thereof is to the right or to the left of the cutting tool as it travels across the workpieces.

The lower cutting tool assembly 112 is a vertical mirror image of the assembly 111 and needs no further or detailed description.

*Operation*

The operation of the mechanism herein specifically described will be substantially apparent from the above set forth description of the method carried out by said apparatus but certain features thereof will be set forth hereinafter to assure a complete understanding of the invention.

Assuming that the roll 51 (FIGURE 16) has been feeding through the apparatus and is approaching its end, a fresh roll will be placed at 59 and its leading end made ready to join the trailing end of the roll 51. This is accomplished, after stopping of driving rolls 54 and 56, by any convenient and well-known means, such as by threading the leading end of the lower strip over the guide roll 61 and through the alignment means 55. As the trailing end comes off the roll 51 it will be moved, by hand or automatically as desired, so that the overlapped portions of the two strips enter between the clamps 82 and 83 on the upper side and clamps 87 and 88 on the lower side. At this point the clamps come together and said strips are held fixedly with respect to each other. Looking at it from the position of FIGURE 7, this means that the free end on the upper side is to the right of direction of travel of the carriage 97. Thus, the cylinders 129 and 130 (FIGURE 9) will be actuated to place the upper bracket 126 in the position shown in FIGURE 9 so that its cutting tool is in position as shown in FIGURE 9 to cut as shown in FIGURE 15a, and to place the lower cutting tool assembly in the position indicated at 11, also shown in FIGURES 9 and 15a. As shown in FIGURE 20, the tips of the tools 9 and 11 are positioned between the overlapped portions of the sheets and on opposite sides of weld zone 3 to be formed thereon. This eliminates the difficulty of inserting the tools between thin gauge clamped sheets. However, if desired or necessary the tools 9 and 11 can be located beyond the sheets in which case they will be inserted between the sheets after the weld zone is formed.

With the actuating of the clamps as above set forth, the cylinders 104 and 106 (FIGURES 7 and 8) will now be actuated together with the cylinders 110 and 115 so that electrodes 102 and 103, respectively, will engage the work. The carriage is now moved across the work effecting a weld between said overlapped and clamped strips and the cutting tools following immediately behind the welding electrodes cut and peel off the free ends extending beyond the welding zone. A mashing roll may follow the cutting tools if desired.

The clamps, electrodes and cutting tools are now all retracted, simultaneously or substantially so, and the cut off ends are removed by any convenient means not shown. The driving rolls 54 and 56 (FIGURE 16) are again started and the operation is complete.

When the roll 59 becomes exhausted and its trailing end is to be attached to the leading end of a fresh roll placed at 51, then the free ends, respectively, will be below and to the right and above and to the left. This will call for a reversal of the cutting tool positions by actuation of cylinders 129 and 130 (FIGURE 9) into their opposite positions so that the cutting tools 9a and 11a now come into operating position as indicated in FIGURE 15b. The carriage 97 has in the meantime retracted into the position as shown in FIGURE 8 and the cycle is ready to repeat.

While the welding step herein described has some general correspondence to apparatus and techniques presently known, it will be recognized by those acquainted with operations and equipment of this type that the present invention eliminates the end trimming and locating which is now required to effect a precise amount of overlap and to insure that the weld seam is in its proper position with respect to the overlapped material. Here no such positioning or pre-trimming is required but instead any reasonable overlap can be used providing only that it does not waste an unreasonable amount of material. Since the free ends are trimmed off immediately following the welding operation, without requiring appreciably more time than that which is required to effect the welding operation alone, the saving in time by the present invention is equal almost to the entire amount of time previously required by the positioning and pre-trimming operation. Experimental work has shown this time saving to be from 30–50 percent of the amount of time previously required.

Since the specific detailed steps by which the broad process concept is carried out, as well as the particular apparatus illustrating both the apparatus aspects of the invention and means by which the process may be practiced, are chosen only to illustrate the invention, it will be understood that other specific steps and items of apparatus may be employed within the broader aspects of the invention. Accordingly, the hereinafter appended claims will be understood as including many variations from the specific steps and apparatus herein shown and said claims will be understood as including such variations excepting as they may by their own express terms provide otherwise.

What is claimed is:

1. An apparatus for joining together adjacent ends of two elongated strips of weldable material, comprising:
 means for supporting two elongated strips of weldable material and feeding same in a longitudinal direction so that adjacent longitudinal ends of said strips are overlapped;
 a frame adapted for receiving the overlapped adjacent ends of said two strips;
 clamping means for clamping together said adjacent ends to said two strips while maintaining such overlapping relation;
 a movable carriage and means mounting said carriage on said frame for transverse movement with respect to said strips from one lateral edge of said strips to the opposite lateral edge thereof;
 a pair of vertically spaced seam welding roller electrodes mounted on said carriage and adapted to be positioned respectively above and below said strips and engaging opposite sides thereof whereby, as said carriage is moved transversely across said trips, the overlapped adjacent end of said strips can be welded together with the longitudinal extent of the weld zone being less than the longitudinal extent of the overlapping;
 a pair of substantially parallel, offset and adjacent shearing means mounted on said carriage for movement therewith, said shearing means being located behind said seam welding electrodes and being movable simultaneously therewith for cutting off portions of the strips between the weld zone and the free edges of said strips.

2. An apparatus according to claim 1, including a pair of brackets pivotally mounted upon said carriage, said shearing means including a first pair of knives respectively secured to said brackets and movable therewith into and out of parallel, offset and adjacent positions, and a second pair of knives respectively secured to said brackets and movable therewith into and out of parallel, offset and adjacent positions, only one of said pairs of knives being movable into said positions at one time, one of said pairs of knives being arranged for cutting off said portions of said strips when one of said strips is uppermost and the other of said pairs of knives being arranged for cutting off said portions when the other strip is uppermost.

3. An apparatus according to claim 1, wherein said shearing means comprises a pair of knives having vertically spaced cutting edges substantially disposed at the same angles with respect to their direction of movement.

References Cited by the Examiner

UNITED STATES PATENTS

| | | | |
|---|---|---|---|
| 2,120,316 | 6/1938 | Stone | 29—33 |
| 2,124,849 | 7/1938 | Drain | 29—33 |
| 2,143,969 | 1/1939 | Biggert | 29—332 |
| 2,169,824 | 8/1939 | Tubbs | 29—481 |
| 2,892,921 | 6/1959 | Mecklenborg | 219—83 |
| 2,894,323 | 7/1959 | Sowter et al. | 29—481 |

RICHARD H. EANES, Jr., *Primary Examiner.*

JOHN F. CAMPBELL, *Examiner.*